April 11, 1939.  G. E. KRIDER  2,154,047
TRACTION DEVICE
Filed Nov. 16, 1937
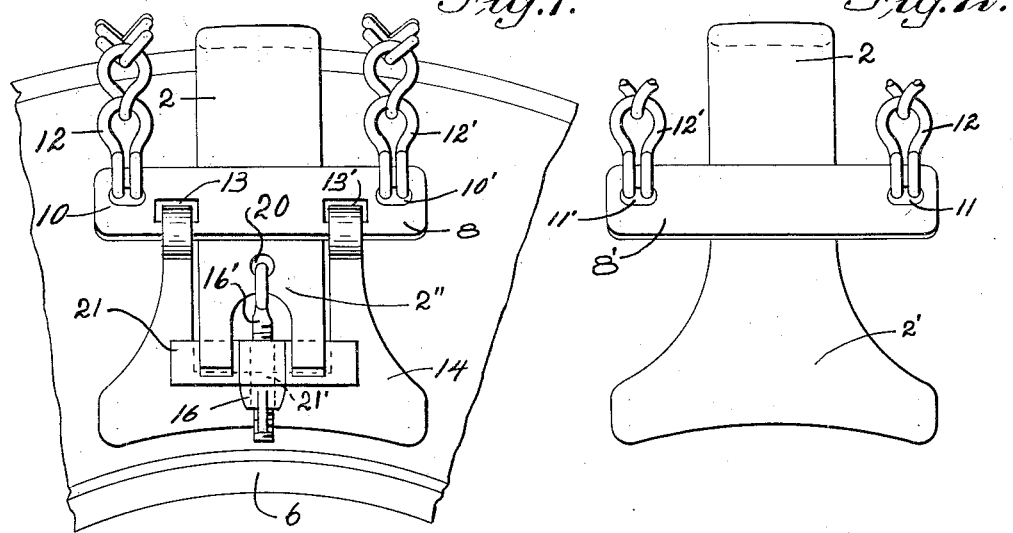
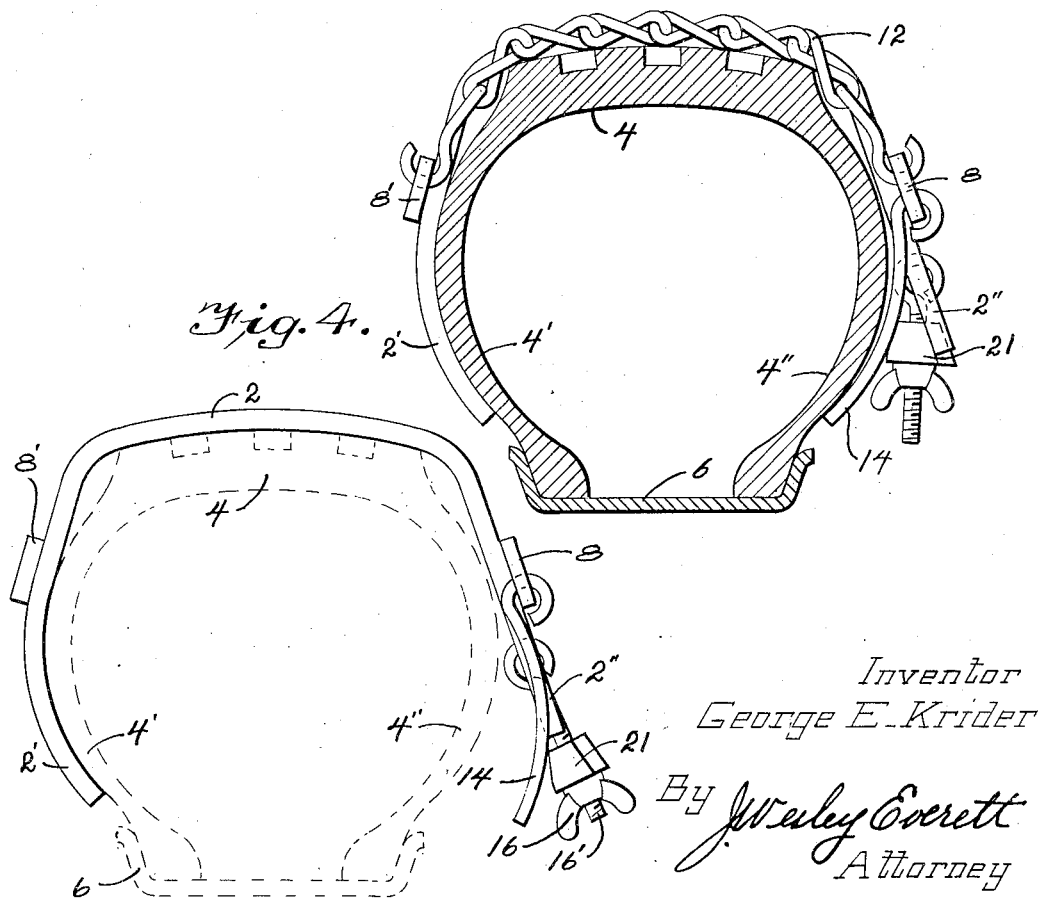
Inventor
George E. Krider
By J. Wesley Everett
Attorney Patented Apr. 11, 1939

2,154,047

UNITED STATES PATENT OFFICE 2,154,047

TRACTION DEVICE

George E. Krider, Blair County, Pa.

Application November 16, 1937, Serial No. 174,853

5 Claims. (Cl. 152—233)

The present invention relates to an anti-skid traction device for wheeled vehicles and particularly to a type which may be quickly and readily applied to the tire with very little effort.

There are however many types of these anti-skid traction devices in present day use. The most common form being a chain held in place on the surface of the tread of the tire by means extending around the rim of the wheel. The difficulty with this form is that most of the present day motor cars have a solid disk type wheel, which are not provided with openings through which the fastening means can be inserted.

It is therefore the primary object of the present invention to provide novel means by which such a novel device may be secured to a wheel which is not provided with openings or other means for securing the device to the wheel.

A more specific object of the invention is to provide a simple and easily manipulated clamping arrangement which may be clamped directly to the tire.

Still a more specific object of the invention is to provide novel means for positioning and spacing the anti-skid member upon the tire tread.

Still other objects will appear from the specifications taken in connection with the drawing which forms a part of this application and in which:

Fig. 1 is a fragmentary view in elevation of a vehicle tire showing one side of the device in position thereon.

Fig. 2 is a view in elevation showing the opposite side of the device.

Fig. 3 is a cross-sectional view of a vehicle tire and rim showing the device clamped thereto.

Fig. 4 is a view similar to Fig. 3 showing the device about the tire in unclamped position.

The present embodiment of the invention therefore comprises a curved member 2 adapted to extend around the tire 4 as shown in Figs. 1, 3, and 4. The broadened lower end portion 2' of the member 2 is designed to clamp upon the side wall of the tire 4' below the transverse median line adjacent the rim 6, while the opposite end of the member 2 extends slightly outward and along the side wall of the opposite side of the tire, as shown at 2''.

The member 2 is provided on either side of the tread with cross members 8 and 8' which are rigidly secured thereto. The ends of these cross members are perforated at 10, 10', 11, and 11' to receive the ends of the anti-skid members 12 and 12'. The member 8 is also perforated at 13 and 13' adjacent the side of the member 2 for receiving a forked member 14. The outer ends of the forked member 14 are hinged within the apertures 13 and 13' so that it may be easily moved back and forth. The member is also shaped similar to the portion 2' which is adapted to contact the tire at 4'' when the device is locked in position on the tire.

The portion 2'' of the member 2 is provided with an elongated bifurcation (see Fig. 1) and is of such diameter as to allow the winged nut 16 and the bolt 16' upon which the nut is threadedly receivable to swing freely through the opening. The bolt 16' is fastened to the member 2 by having its end looped through the hole 20.

The locking mechanism for clamping the member 14 to the tire comprises a bar member 21 tapered toward one of its sides and having a hole 21' extending transversely therethrough, which is slidably mounted on the bolt 16' and adapted to be relatively positioned thereon by the winged nut 16. The member 21 is slightly longer than the opening between the forked portion of the member 14, which allows the ends of the bar to extend out a short distance on each side of the opening and rest upon the member 14. The bar is adapted to operate between the lower portion 2'' and the member 14 for moving the member 14 inwardly against the side wall of the tire.

The construction of the clamping means must be sufficiently strong to enable it to securely grip the side walls of the tire for keeping it rigidly clamped in position. The top portion of the member 2 is slightly curved to conform with the circumference of the tire.

The anti-skid members are usually constructed of short chains 12 and 12', but other types of members may be employed such as fibre, rubber, cable, and the like. It is also preferable to have these members extend upwardly and over the outer surface of the tire above the member 2 to prevent the clamping means from receiving the wear and shock caused by coming in contact with the road.

In applying the device to the tire of a vehicle any particular location along the tire may be selected. The winged nut 16 is moved outwardly, if not already in this position, toward the outer end of the bolt 16' until the member 14 is released by the tapered bar member 21. The side 2' of the curved member is placed over the tire as shown in Fig. 4. The member 14 is then moved inwardly to the side wall 4'' and the tapered bar 21 is inserted between the bifurcated portion 2' of the member 2 and the member 14. By use of the winged nut 16 the bar may be forced up between the members with very little effort to clamp the device to the tire. In most cases the device may be applied or removed without the aid of tools, as the winged nut can usually be moved a sufficient distance by hand to accomplish the clamping.

The present device is economical to manufacture and simple in its construction. It is adaptable to all occasions where it is either advisible or necessary to use anti-skid equipment on motor vehicle tires. It will be particularly appreciated by those who are frequently required to temporarily apply or remove such equipment for emergency purposes. For example, in snowdrifts and on mountain roads, which are usually icy in freezing weather, and may require the use of such a device for only a comparatively short time.

While one form of the invention has been shown and described in detail, it is to be understood that the invention is not to be limited to this specific disclosure, and its scope is best defined in the following claims.

I claim:

1. A traction device for vehicle tires having a clamping means for clamping said tires, said clamping means comprising a curved member extending over the tread of said tire and curved in the direction of the tire rim, flexible anti-skid means secured to the said curved member and adapted to extend transversely across the tread of said tire, means on one end of said curved member for contacting one side of the said tire, means on the other end of said curved member for pivotably supporting a movable hinge member, said hinge member adapted to contact the opposite side of said tire, means operatable between the curved member and the hinge member for forcing the said hinge member against the said tire.

2. A traction device for vehicle tires having a clamping means for clamping said tires, said clamping means comprising a curved member extending over the tread of said tire and curved in the direction of the tire rim, flexible anti-skid means secured to the said curved member and adapted to extend transversely across the tread of said tire, means on one end of said curved member for contacting one side of the said tire, means on the other end of said curved member for pivotably supporting a movable hinge member, said hinge member adapted to contact the opposite side of said tire, means slidable between the curved member and the hinge member in the direction of said pivot for forcing the said hinge member against said tire.

3. A traction device for vehicle tires having a clamping means for clamping said tires, said clamping means comprising a curved member extending over the tread of said tire and adapted to clamp the side walls thereof adjacent the tire rim, means secured to said curved member on either side of said tread for positioning and supporting flexible anti-skid members across the tread of said tire, said positioning and supporting means adapted to space said anti-skid members out of contact position with the said curved member when said device is clamped in position on said tire.

4. In a device of the character described comprising a U-shaped member adapted to extend over the tread and conform to the outer surface of the transverse curvature of a vehicle tire and clamped to the side walls thereof adjacent the tire rim, one side of said U-shaped member having a hinged clamping means for contacting one of said tire side walls, the opposite side of said U-shaped member being rigid and formed to contact the opposite side wall of said tire side wall, said hinged clamping means being pivotably supported at a point along the side portion of the said U-shaped member leaving a portion of the U-shaped member extending from said pivot to the open end thereof, means for adjusting the distance between the hinged clamping means and the extended portion of the U-shaped member, whereby the said hinged clamping means may be moved inwardly to contact the said tire side wall.

5. In a device of the character described of a U shape member, said U shape member being adapted to conform and extend over the tread of a vehicle tire and clamping the side walls thereof adjacent the tire rim, flexible individual anti-skid members secured to said U shape member, said U shape member having means on each side thereof and extending laterally therefrom for receiving and supporting the ends of said anti-skid member for positioning the said anti-skid member over the tire tread when the said device is clamped to said tire.

GEORGE E. KRIDER.